United States Patent
Seo et al.

(10) Patent No.: US 10,873,888 B2
(45) Date of Patent: Dec. 22, 2020

(54) METHOD FOR CONFIGURING SYNCHRONIZATION FOR MOBILE RELAY NODE IN NEXT GENERATION WIRELESS COMMUNICATION SYSTEM AND DEVICE FOR SAME

(71) Applicant: LG ELECTRONICS INC., Seoul (KR)

(72) Inventors: Hanbyul Seo, Seoul (KR); Seungmin Lee, Seoul (KR); Kijun Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 16/314,948

(22) PCT Filed: Jun. 23, 2017

(86) PCT No.: PCT/KR2017/006630
§ 371 (c)(1),
(2) Date: Jan. 3, 2019

(87) PCT Pub. No.: WO2018/008878
PCT Pub. Date: Jan. 11, 2018

(65) Prior Publication Data
US 2019/0268817 A1    Aug. 29, 2019

Related U.S. Application Data

(60) Provisional application No. 62/358,146, filed on Jul. 4, 2016, provisional application No. 62/363,819, filed on Jul. 18, 2016.

(51) Int. Cl.
*H04W 36/08* (2009.01)
*H04W 56/00* (2009.01)
*H04W 84/04* (2009.01)

(52) U.S. Cl.
CPC .......... *H04W 36/08* (2013.01); *H04W 56/00* (2013.01); *H04W 56/001* (2013.01); *H04W 84/04* (2013.01)

(58) Field of Classification Search
CPC ... H04W 36/08; H04W 56/00; H04W 56/001; H04W 84/04
See application file for complete search history.

(56) References Cited

U.S. PATENT DOCUMENTS 9,037,075 B2 * 5/2015 Takano .............. H04B 7/15507
455/7
9,042,346 B2 * 5/2015 Kim .................. H04W 36/0005
370/331

(Continued)

FOREIGN PATENT DOCUMENTS

AU         3359901 A  * 7/2001  ........ H04W 36/0072
CN       102811469 B  * 8/2018  ............ H04W 36/08
(Continued)

*Primary Examiner* — Eric Nowlin
(74) *Attorney, Agent, or Firm* — Dentons US LLP

(57) ABSTRACT

A method for transmitting and receiving a signal by a relay node in a wireless communication system is disclosed. More particularly, the method comprises the steps of: during communication on the basis of a first backhaul link synchronization and a first access link synchronization, transmitting, to a terminal, information about change initiation to a second backhaul link synchronization; configuring a frame synchronization from the first backhaul link synchronization; and in order to configure to the terminal a second access link synchronization determined on the basis of the second backhaul link synchronization, transmitting a synchronization signal to the terminal.

4 Claims, 14 Drawing Sheets

(56) References Cited

U.S. PATENT DOCUMENTS

| | | | |
|---|---|---|---|
| 9,554,307 B2* | 1/2017 | Chen | H04W 16/02 |
| 10,045,378 B2* | 8/2018 | Xu | H04W 74/08 |
| 10,206,232 B2* | 2/2019 | Novlan | H04B 7/15507 |
| 10,356,734 B2* | 7/2019 | Ramanujam | H04L 27/2613 |
| 10,383,136 B2* | 8/2019 | Wang | H04W 72/1226 |
| 10,440,688 B2* | 10/2019 | Ramakrishna | H04B 7/15528 |
| 10,470,136 B1* | 11/2019 | Ghosh | H04W 88/10 |
| 2012/0028627 A1* | 2/2012 | Hunzinger | H04W 36/00837 |
| | | | 455/422.1 |
| 2013/0017776 A1* | 1/2013 | Takano | H04B 7/15507 |
| | | | 455/7 |
| 2013/0294330 A1* | 11/2013 | Kim | H04W 36/0005 |
| | | | 370/315 |
| 2014/0194127 A1* | 7/2014 | Wang | H04W 36/0055 |
| | | | 455/438 |
| 2015/0131618 A1* | 5/2015 | Chen | H04W 16/02 |
| | | | 370/332 |
| 2015/0334611 A1* | 11/2015 | Kim | H04W 36/0083 |
| | | | 370/331 |
| 2016/0330603 A1* | 11/2016 | Chuang | H04B 7/15507 |
| 2017/0339719 A1* | 11/2017 | Xu | H04W 74/08 |
| 2018/0092139 A1* | 3/2018 | Novlan | H04W 74/0833 |
| 2018/0152905 A1* | 5/2018 | Ramanujam | H04W 56/0005 |
| 2018/0352524 A1* | 12/2018 | Abedini | H04L 5/0053 |
| 2019/0110266 A1* | 4/2019 | Abedini | H04W 56/0015 |
| 2019/0174441 A1* | 6/2019 | Ramanujam | H04W 56/0005 |
| 2019/0261294 A1* | 8/2019 | Gupta | H04W 88/04 |
| 2019/0268817 A1* | 8/2019 | Seo | H04W 56/00 |
| 2019/0349871 A1* | 11/2019 | Ghosh | H04W 56/001 |
| 2019/0357096 A1* | 11/2019 | Warashina | H04W 36/0066 |
| 2019/0357161 A1* | 11/2019 | Gupta | H04W 88/04 |
| 2019/0363843 A1* | 11/2019 | Gordaychik | H04W 8/22 |
| 2020/0053655 A1* | 2/2020 | Ghosh | H04L 5/005 |
| 2020/0084819 A1* | 3/2020 | Abedini | H04W 76/38 |

FOREIGN PATENT DOCUMENTS

| | | | | |
|---|---|---|---|---|
| DE | 19962264 A1 * | 7/2001 | | H04W 36/0072 |
| KR | 1020100063555 A | 6/2010 | | |
| KR | 1020120129931 A | 11/2012 | | |
| KR | 1020140078511 A | 6/2014 | | |
| KR | 1020150013123 A | 2/2015 | | |
| WO | WO-0147289 A2 * | 6/2001 | | H04W 36/0072 |
| WO | WO-0147289 A3 * | 4/2002 | | H04W 36/0072 |
| WO | WO-2013185690 A1 * | 12/2013 | | H04W 52/246 |

* cited by examiner (A) CONTROL-PLANE PROTOCOL STACK (B) USER-PLANE PROTOCOL STACK

METHOD FOR CONFIGURING SYNCHRONIZATION FOR MOBILE RELAY NODE IN NEXT GENERATION WIRELESS COMMUNICATION SYSTEM AND DEVICE FOR SAME

This application is a National Stage Application of International Application No. PCT/KR2017/006630, filed on Jun. 23, 2017, which claims the benefit of U.S. Provisional Application No. 62/358,146, filed on Jul. 4, 2016 and U.S. Provisional Application No. 62/363,819, filed on Jul. 18, 2016, all of which are hereby incorporated by reference in their entirety for all purposes as if fully set forth herein.

TECHNICAL FIELD

The present invention relates to a next generation wireless communication system, and more particularly, to a method of configuring synchronization for a mobile relay node in a next generation wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the aforementioned discussion, the present invention proposes a method of configuring synchronization for a mobile relay node in a next generation wireless communication system and an apparatus therefor.

Technical Solution

To achieve these and other advantages and in accordance with the purpose of the present invention, as embodied and broadly described, according to one embodiment, a method of transmitting and receiving a signal, which is transmitted and received by a relay node in a wireless communication system, includes the steps of, when communication is performed based on first backhaul link synchronization and first access link synchronization, transmitting change initiation information indicating change to second backhaul link synchronization to a user equipment (UE), setting frame synchronization with the second backhaul link synchronization from the first backhaul link synchronization, and transmitting a synchronization signal to the UE to set second access link synchronization, which is determined based on the second backhaul link synchronization, to the UE.

To further achieve these and other advantages and in accordance with the purpose of the present invention, according to a different embodiment, a relay node in a wireless communication system includes a wireless communication module and, when communication is performed based on first backhaul link synchronization and first access link synchronization, a processor configured to transmit change initiation information indicating change to second backhaul link synchronization to a user equipment (UE) in a manner of being connected with the wireless communication module, the processor configured to set frame synchronization with the second backhaul link synchronization from the first backhaul link synchronization, the processor configured to transmit a synchronization signal to the UE to set second access link synchronization, which is determined based on the second backhaul link synchronization, to the UE.

Preferably, when the change initiation information indicating the change to the second backhaul link synchronization is transmitted, if a difference between the first backhaul link synchronization and the second backhaul link synchronization is equal to or greater than a threshold, the change initiation information indicating the change to the second backhaul link synchronization can be transmitted to the UE.

Preferably, it is able to transmit and receive a signal with the UE according to the second access link synchronization using a parameter corresponding to the first access link synchronization after the second access link synchronization is set. In this case, the parameter can include at least one of a TA (Timing Advance) value for access uplink of the UE and a power control factor.

Additionally, when the frame synchronization is configured with the second backhaul link synchronization, it may include the step of performing handover from a first base station corresponding to the first backhaul link to a second base station corresponding to the second backhaul link.

More preferably, information on a resource for transmitting the synchronization signal can be transmitted to the UE in advance before the synchronization signal is transmitted to the UE.

Advantageous Effects

According to embodiments of the present invention, a mobile relay node can more efficiently configure synchronization in a next generation wireless communication system.

It will be appreciated by persons skilled in the art that the effects that can be achieved through the present invention are not limited to what has been particularly described hereinabove and other advantages of the present invention will be more clearly understood from the following detailed description.

BEST MODE

Mode for Invention

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
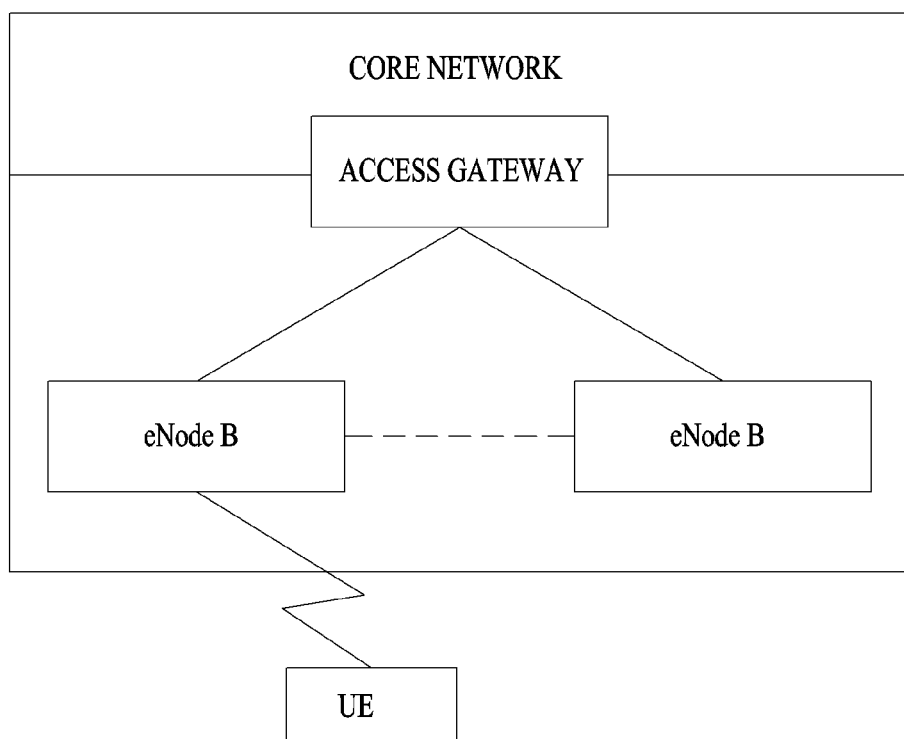
FIG. 1 is a diagram schematically illustrating a network structure of an E-UMTS as an exemplary radio communication system.
Figure 2:
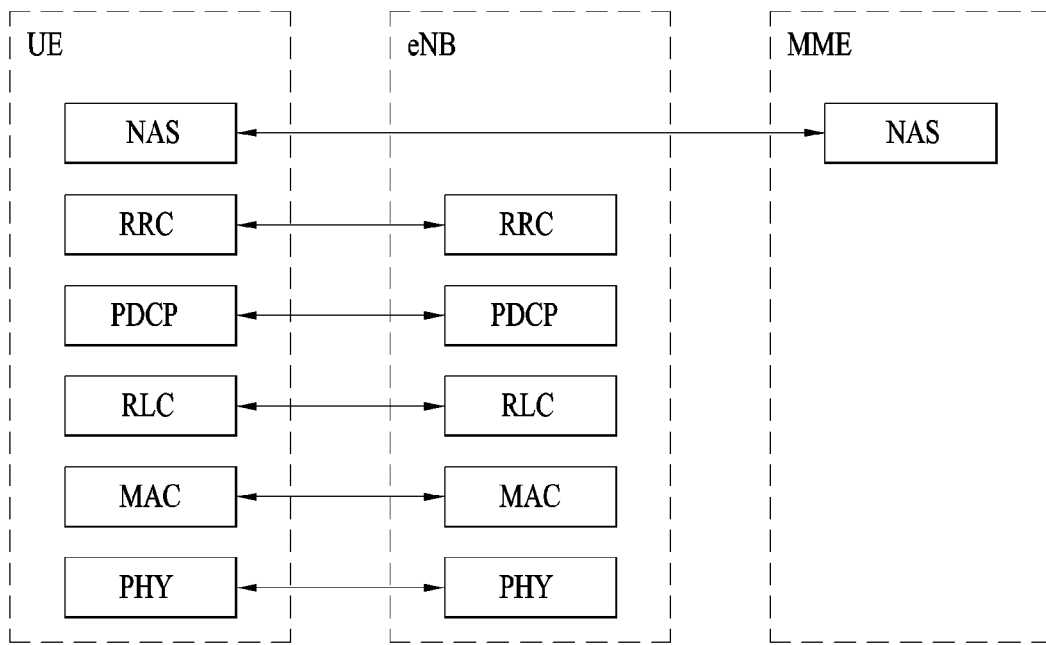
FIG. 2 is a diagram illustrating structures of a control plane and a user plane of a radio interface protocol between a UE and an E-UTRAN based on the 3GPP radio access network specification.
Figure 2:
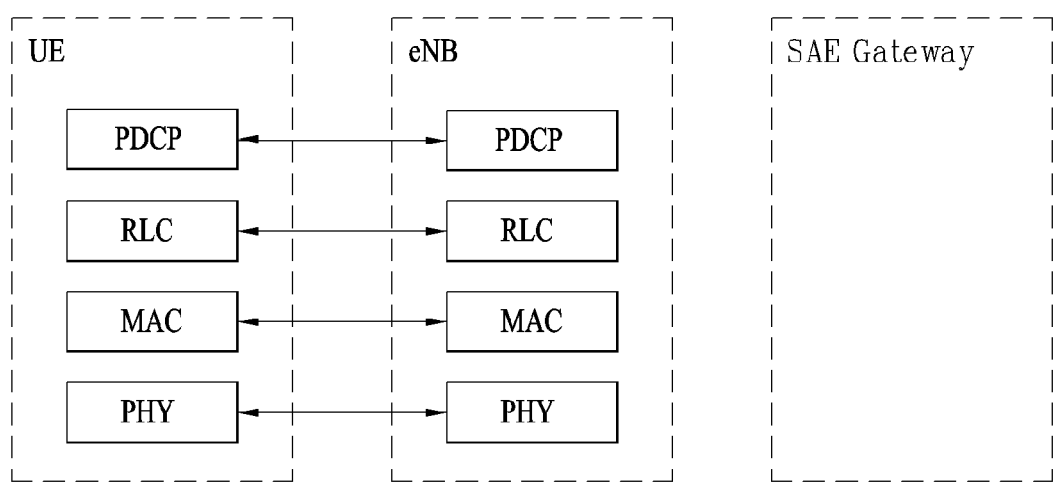

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
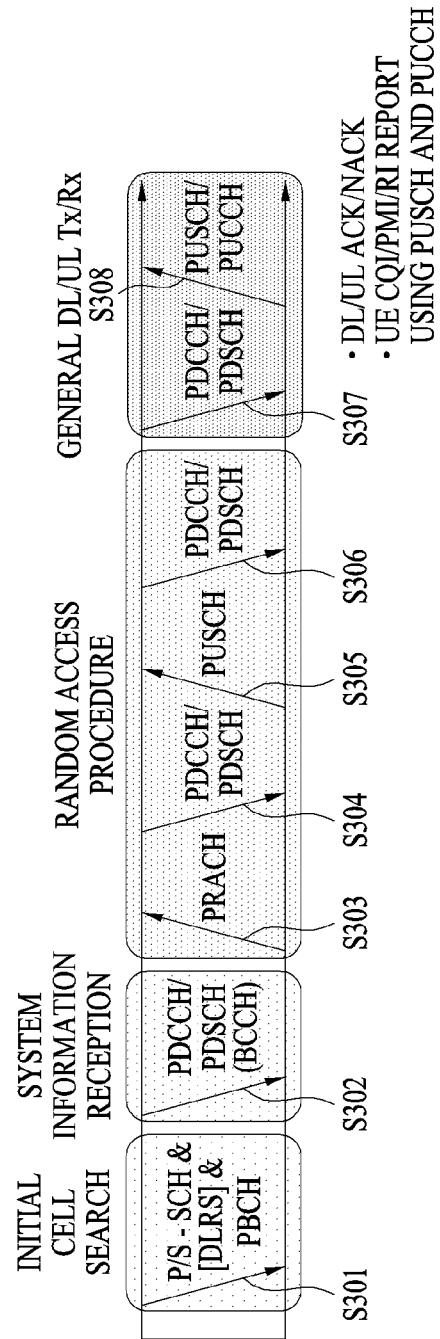
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306).

In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
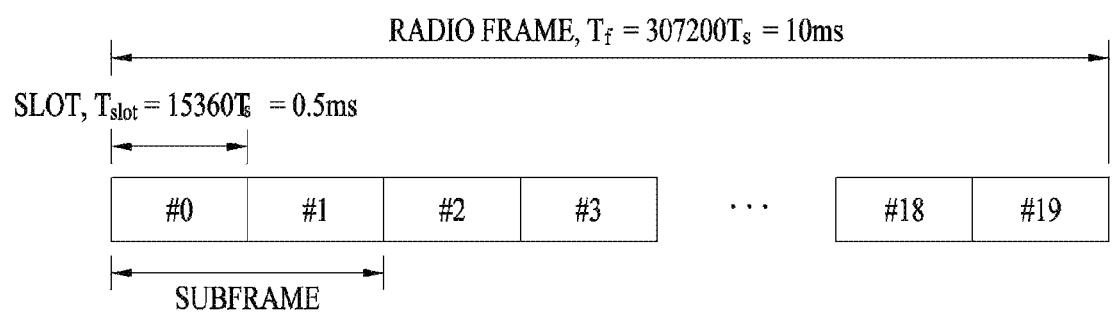
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by $Ts=1/(15 \text{ kHz} \times 2048)=3.2552 \times 10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
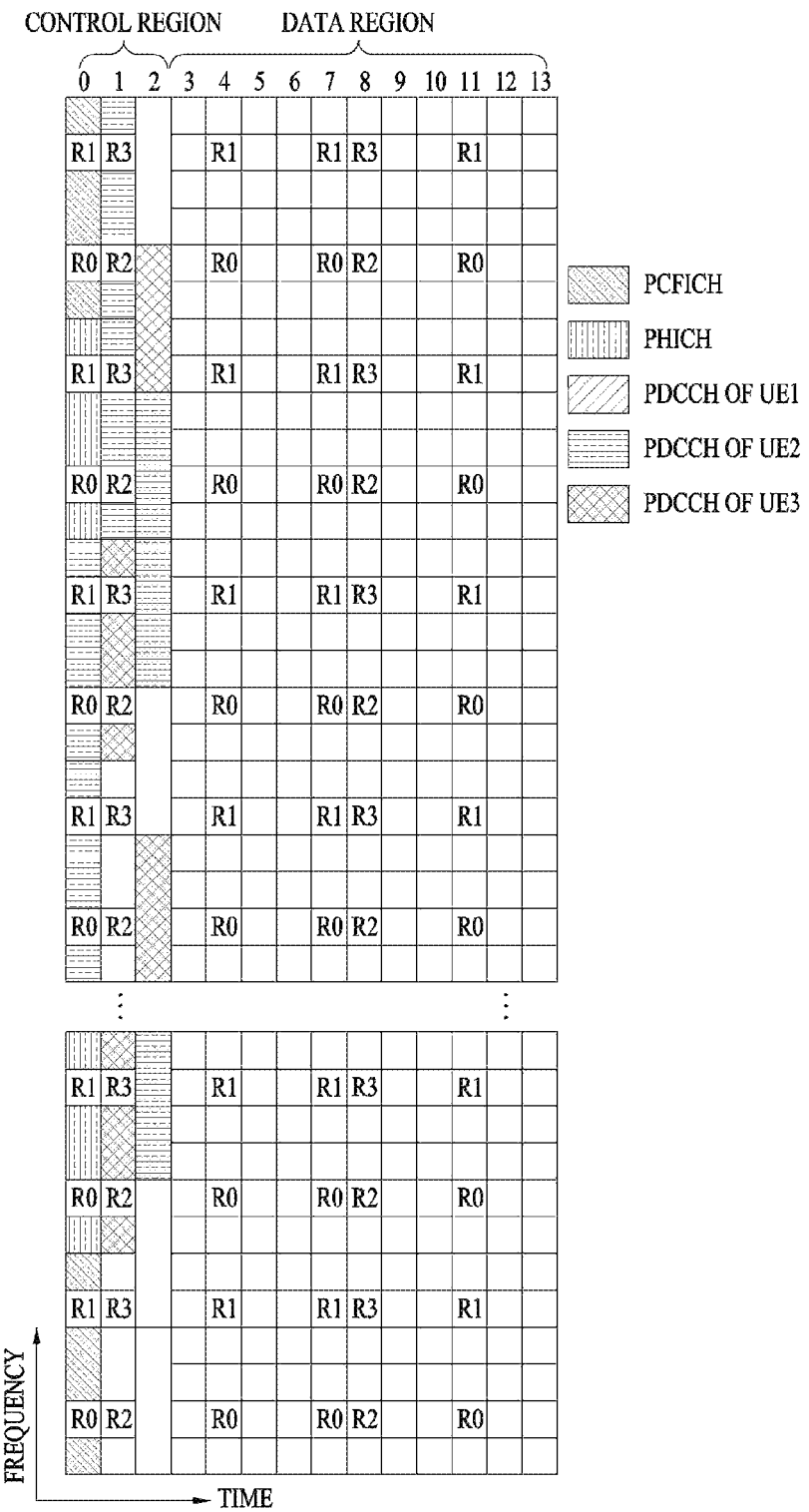
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
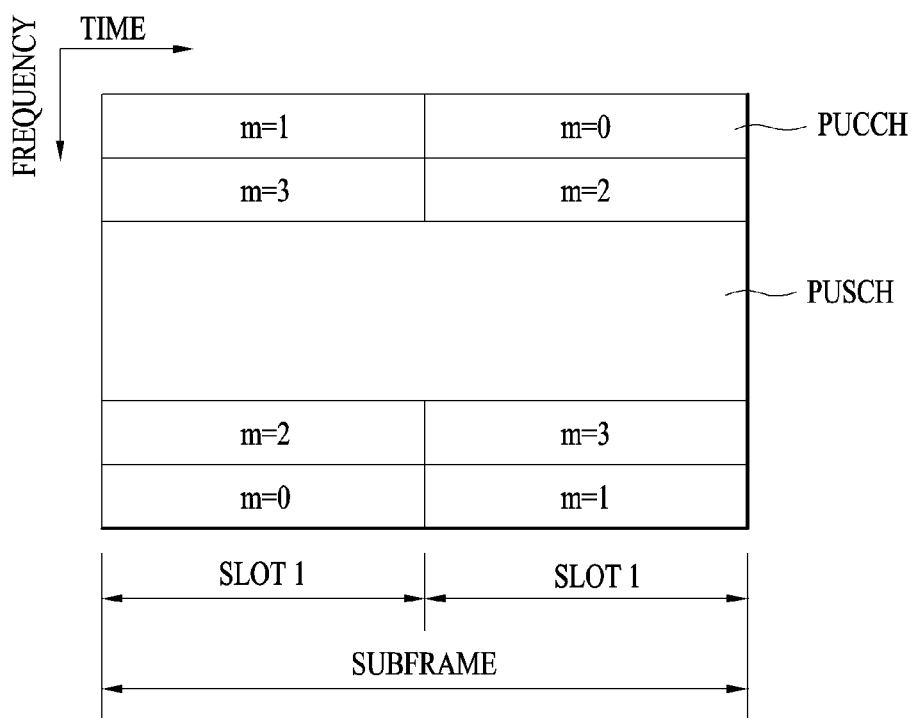
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

In the following, channel state information (CSI) reporting is explained. Current LTE standard defines two kinds of transmission schemes including an open-loop MIMO which is managed without channel information and a closed-loop MIMO which is managed based on channel state information. In order to obtain multiplexing gain of MIMO antennas in the closed-loop MIMO, a base station and a user equipment respectively perform beamforming based on channel state information (CSI). In order for the base station to obtain the CSI from the user equipment, the base station assigns PUCCH (physical uplink control channel) or PUSCH (physical uplink shared channel) to the user equipment and commands the user equipment to feedback downlink CSI.

The CSI is mainly classified into 3 kinds of information including RI (rank indicator), PMI (precoding matrix index) and CQI (channel quality indication). The RI indicates rank information of a channel and means the number of streams capable of being received via an identical frequency-time resource by a user equipment. Since a value of the RI is determined by a long term fading of a channel, the value of the RI is fed back to a base station with an interval longer than a PMI and CQI value in general.

The PMI is a value to which a spatial characteristic of a channel is reflected. The PMI indicates a precoding matrix index of a base station preferred by a user equipment on the basis of a metric including a SINR and the like. The CQI is a value indicating strength of a channel and means a reception SINR capable of being obtained when a base station uses the PMI in general.

In 3GPP LTE-A system, a base station sets a plurality of CSI processes to a UE and can receive CSI report on each of a plurality of the CSI processes from the UE. In this case, a CSI process consists of a CSI-RS resource for specifying signal quality from a base station and a CSI-IM (interference measurement) resource for measuring interference (i.e., IMR (interference measurement resource).

In a millimeter wave (mmW) system, since a wavelength is short, a plurality of antenna elements can be installed in the same area. That is, considering that the wavelength at 30 GHz band is 1 cm, a total of 64 (8*8) antenna elements can be installed in a 4*4 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions capable of being transmitted at the same time is limited to B or less depending on how B TXRUs and Q antenna elements are connected.

Figure 7:
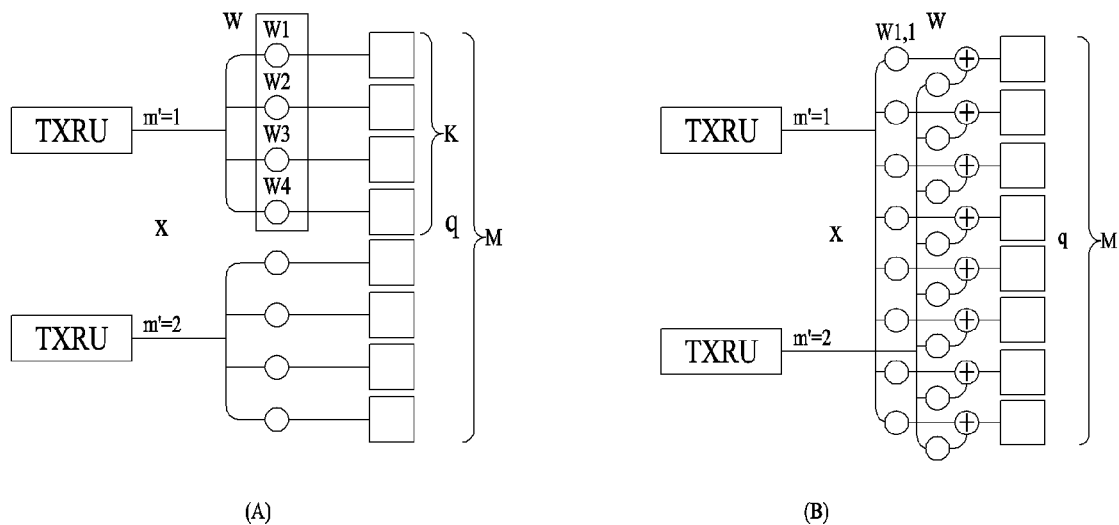
FIG. 7 illustrates examples of connecting TXRUs to antenna elements.

FIG. 7 illustrates examples of connecting TXRUs to antenna elements.

FIG. 7(a) illustrates a method for connecting TXRUs to sub-arrays. In FIG. 7(a), one antenna element is connected to one TXRU only. On the other hand, FIG. 7(b) illustrates a method for connecting all TXRUs to all antenna elements. In FIG. 7(b), all antenna elements are connected to all TXRUs. In FIG. 7, W indicates a phase vector weighted by an analog phase shifter. That is, the direction of analog beamforming is determined by W. In this case, the mapping relationship between CSI-RS antenna ports and TXRUs may be 1-to-1 or 1-to-many.

As more communication devices have demanded higher communication capacity, there has been necessity of enhanced mobile broadband communication as compared with legacy radio access technology (RAT). In addition, massive machine type communication (MTC) for providing various services anytime and anywhere by connecting a plurality of devices and objects to each other is also one main issue to be considered in next-generation communication. Moreover, a communication system to be designed in consideration of services/UEs sensitive to reliability and latency is under discussion. Thus, the introduction of next-generation radio access technology (RAT) has been discussed in consideration of the massive MTC and the communication system above. In the present invention, the above technology is referred to as new RAT.

Figure 8:
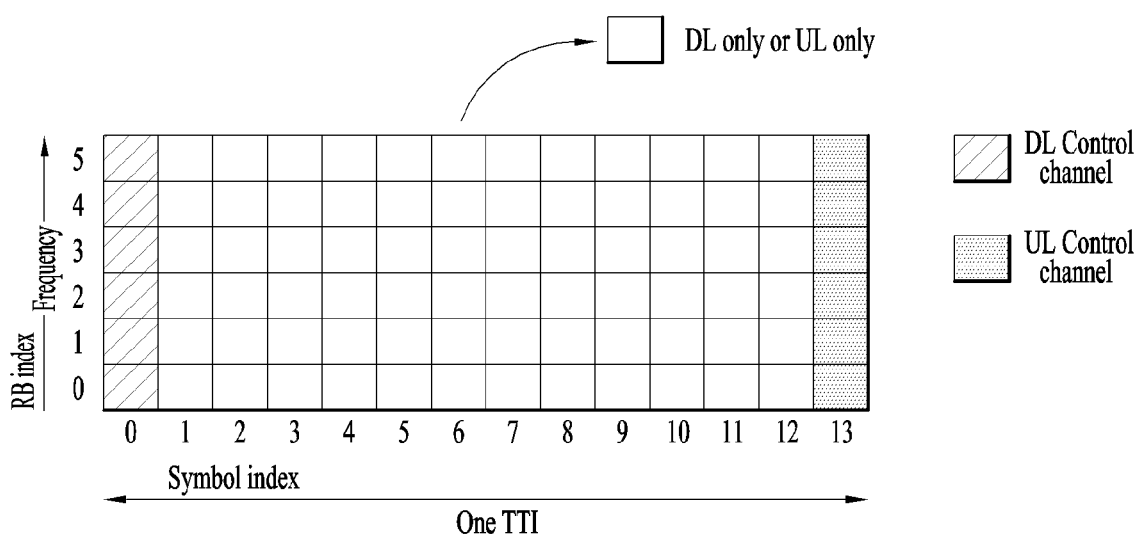
FIG. 8 illustrates an example for a self-contained subframe structure.

In order to minimize data transmission latency in TDD system, 5G new RAT considers a self-contained subframe structure shown in FIG. 8. FIG. 8 illustrates an example for the self-contained subframe structure.

In FIG. 8, a hatched region represents a downlink (DL) control region and a black region represents an uplink (UL) control region. An unmarked region may be used for DL data transmission or UL data transmission. This structure is characterized in that DL transmission and UL transmission are sequentially performed in one subframe so that DL data may be transmitted and a UL ACK/NACK may be received in the subframe. As a result, the time taken to retransmit data when a data transmission error occurs may be reduced, thereby minimizing the latency of final data transmission.

In the self-contained subframe structure, a time gap is needed for the process of switching from a transmission mode to a reception mode or from the reception mode to the transmission mode of a base station and a UE. To this end, some OFDM symbols at the time of switching from DL to UL in the self-contained subframe structure are configured as a guard period (GP).

For example, the self-contained subframe type capable of being configured in a system operating based on the new RAT can be configured by at least one of 4 subframe types described in the following.

DL control region+DL data region+GP+UL control region

DL control region+DL data region

DL control region+GP+UL data region+UL control region

DL control region+GP+UL data region

Meanwhile, when a channel state between a base station and a UE is poor, it is able to provide the UE with a radio channel of better channel state by installing a relay node (RN) between the base station and the UE. In addition, it is able to provide a faster data channel to the UE by introducing a relay node from the base station and using the relay node in a cell boundary region where a channel state is poor, thereby expanding a cell service region. In particular, the relay node is widely used as a technique for resolving a radio wave shadow area in a wireless communication system.

A legacy relay node technique is restricted to a function of a repeater that transmits a signal by simply amplifying the signal. Unlike the legacy relay node technique, a relay node technique is recently evolving in a more intelligent form. Moreover, the relay node technique corresponds to a technique essential not only for reducing base station extension cost and backhaul network management cost but also for expanding service coverage and enhancing a data processing rate. As the relay node technique is evolving, it is necessary to support a relay node used in a legacy wireless communication system in a new wireless communication system.

In 3GPP LTE-A ($3^{rd}$ Generation Partnership Project Long Term Evolution-Advanced) system, when a role of forwarding a link connection between a base station and a UE is introduced to a relay node, two types of links having a different attribute are applied to an uplink carrier frequency band and a downlink carrier frequency band, respectively. A connection link part, which is configured between links of a base station and a relay node, is defined as a backhaul link. When transmission is performed with an FDD (Frequency Division Duplex) or TDD (Time Division Duplex) scheme using a downlink resource, it is referred to as a backhaul downlink. When transmission is performed with FDD or TDD scheme using an uplink resource, it is referred to as a backhaul uplink.

Figure 9:
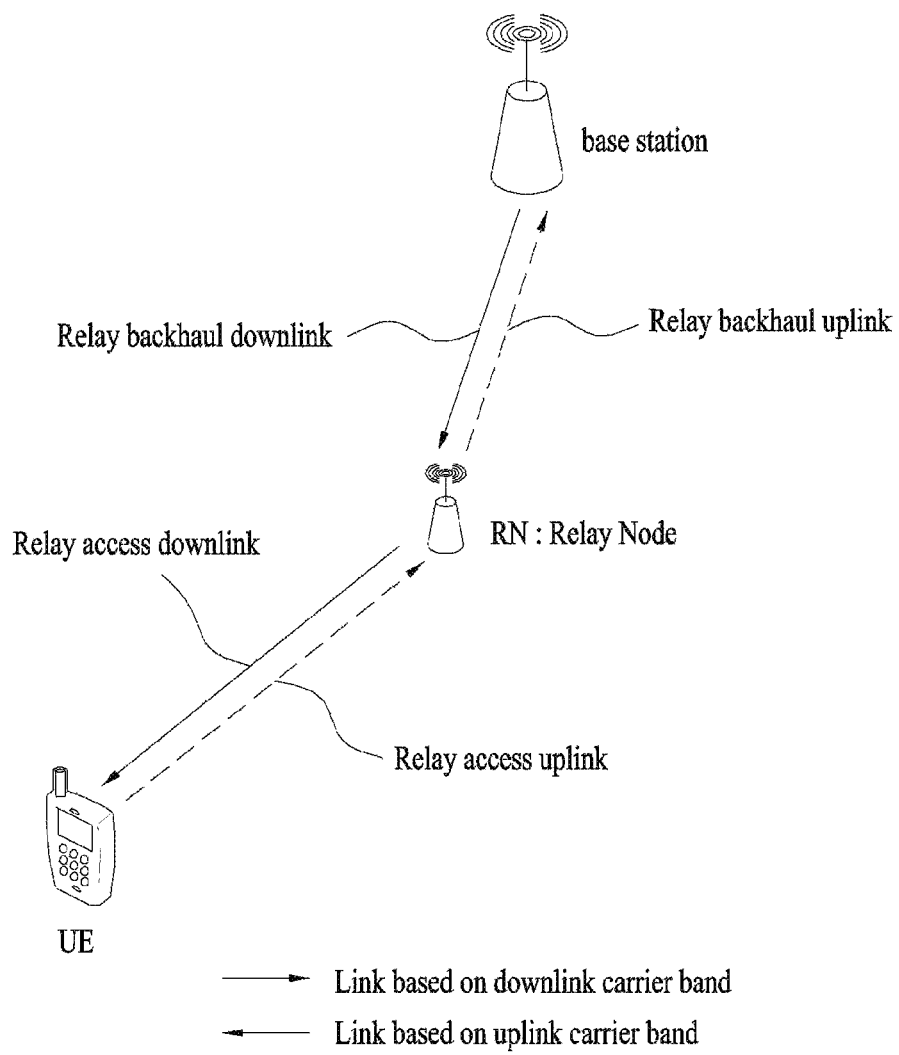
FIG. 9 is a diagram illustrating configurations of a relay backhaul link and a relay access link in a wireless communication system.

FIG. 9 is a diagram illustrating configurations of a relay backhaul link and a relay access link in a wireless communication system.

Referring to FIG. 9, when a relay node is introduced for a role of forwarding a connection of a link between a base station and a UE, two types of links having a different attribute are applied to an uplink carrier frequency band and a downlink carrier frequency band, respectively. A connection link part, which is configured between a base station and a relay node, is defined as a relay backhaul link. When the relay backhaul link performs transmission using a downlink frequency band (FDD case) or a downlink subframe (TDD case) resource, it is represented as a backhaul downlink. When transmission is performed using an uplink frequency band (FDD case) or an uplink subframe (TDD case) resource, it can be represented as a backhaul uplink.

On the other hand, a connection link part, which is configured between a relay node and a series of UEs, is defined as a relay access link. When the relay access link performs transmission using a downlink frequency band (FDD case) or a downlink subframe (TDD case) resource, it is represented as an access downlink. When transmission is performed using an uplink frequency band (FDD case) or an uplink subframe (TDD case) resource, it can be represented as an access uplink.

A relay node (RN) can receive information from a base station via a relay backhaul downlink and can transmit information to the base station via a relay backhaul uplink. The relay node can transmit information to a UE via an access downlink and can receive information from the UE via a relay access uplink.

Meanwhile, in relation to a band (or spectrum) used by the relay node, when a backhaul link and an access link operate on the same frequency band, it is referred to as 'in-band'. When a backhaul link and an access link operate on a different frequency band, it is referred to as 'out-band'. Relay nodes can be classified into a transparent relay node and a non-transparent relay node depending on whether or not a UE recognizes a relay node. In this case, transparent corresponds to a case of failing to recognize whether or not a UE communicates with a network via a relay node. Non-transparent corresponds to a case of recognizing whether or not a UE communicates with a network via a relay node. Moreover, in relation to the control of a relay node, relay nodes can be classified into a relay node configured as a part of a donor cell and a relay node autonomously controlling a cell.

Meanwhile, in order to make a relay node operate on in-band, a partial resource should be reserved for a backhaul link in a time-frequency space and the resource can be configured not to be used for an access link. This is referred to as resource partitioning.

When resource partitioning is performed in a relay node, a general principle of the resource partitioning is described in the following. A backhaul downlink and an access downlink can be multiplexed on a single carrier frequency using a Time Division Multiplexing (TDM) scheme (i.e., one of the backhaul downlink and the access downlink is activated only at the specific time). Similarly, a backhaul uplink and an access uplink can be multiplexed on a single carrier frequency using a TDM scheme (i.e., one of the backhaul uplink and the access uplink is activated only at the specific time).

When backhaul links are multiplexed in FDD, it can be comprehended as backhaul downlink transmission is performed on a downlink frequency band and backhaul uplink transmission is performed on an uplink frequency band. When backhaul links are multiplexed in TDD, it can be comprehended as backhaul downlink transmission is performed in downlink subframes of a base station and a relay node and backhaul uplink transmission is performed in uplink subframes of the base station and the relay node.

For example, in case of an in-band relay node, when reception of a backhaul downlink received from a base station and transmission of an access downlink transmitted to a UE are performed at the same time on a predetermined frequency band, a signal transmitted from a transmitting end of the relay node can be received at a receiving end of the relay node. As a result, signal interference or RF jamming may occur at an RF front-end of the relay node. Similarly, when reception of an access uplink received from the UE and transmission of a backhaul uplink transmitted to the base station are performed at the same time on a predetermined frequency band, signal interference may occur at the RF front-end of the relay node. In particular, when a relay node performs transmission and reception at the same time on a single frequency band, it is difficult to implement the transmission and the reception unless a reception signal is sufficiently separated from a transmission signal (e.g., Tx antenna and Rx antenna are geographically and sufficiently separated).

As a solution for the signal interference problem, when a relay node receives a signal from a donor cell, it may be able to configure the relay node not to transmit a signal to a UE. In particular, a gap is generated at transmission transmitted to the UE by the relay node. It is able to configure the UE (including a legacy UE) not to expect any transmission from the relay node during the gap. The gap can be configured by configuring an MBSFN (Multicast Broadcast Single Frequency Network) subframe.

Figure 10:
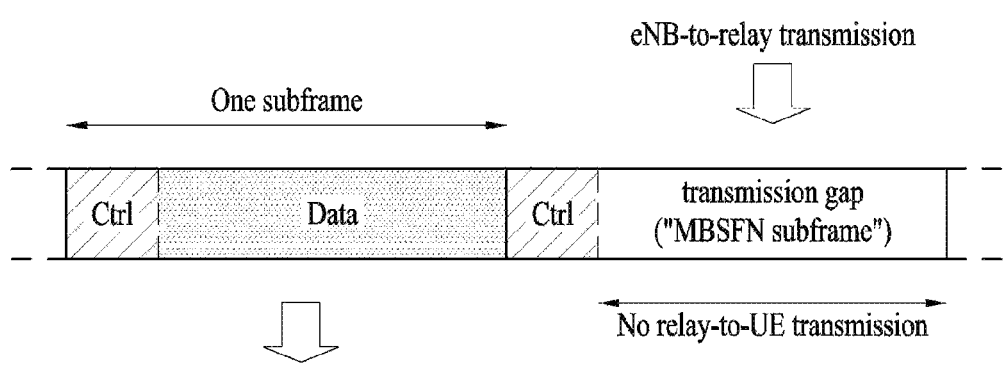
FIG. 10 is a diagram illustrating an example for resource partitioning of a relay node.

FIG. 10 is a diagram illustrating an example for resource partitioning of a relay node.

Referring to FIG. 10, the first subframe corresponds to a normal subframe. A relay node transmits a downlink (i.e., access downlink) control signal and data to a UE in the normal subframe. The second subframe corresponds to an MBSFN subframe. The relay node transmits a control signal to the UE in a control region of a downlink subframe. However, the relay node performs no transmission to the UE in the remaining region of the downlink subframe.

In this case, since a legacy UE expects PDCCH transmission in all downlink subframes (in other word, since it is necessary for a relay node to support legacy UEs belonging to a region of the relay node to make the legacy UEs receive PDCCH in every subframe and perform a measurement function), in order to make the legacy UE properly operate, it is necessary to transmit PDCCH in all downlink subframes.

Hence, it is necessary for the relay node to transmit an access downlink rather than receive a backhaul downlink in the first N (N=1, 2, or 3) number of OFDM symbol sections of a subframe which is configured for a downlink (i.e., backhaul downlink) transmission transmitted to the relay node from a base station. In this case, since PDCCH is transmitted to the UE from the relay node in a control region of the second subframe, it is able to provide backward compatibility to a legacy UE served by the relay node. The relay node can receive a transmission transmitted from the base station in the remaining region of the second subframe while no transmission is performed to the UE from the relay node. In particular, it is able to configure an access downlink transmission and a backhaul downlink reception not to be performed at the same time in an in-band relay node via the resource partitioning scheme.

The second subframe using the MBSFN subframe is explained in more detail. A control region of the second subframe may correspond to a relay node non-hearing section.

The relay node non-hearing section corresponds to a section that a relay node transmits an access downlink signal without receiving a backhaul downlink signal. The relay node non-hearing section can be configured by a length of 1, 2, or 3 OFDM symbols. A relay node transmits an access downlink to a UE in the relay node non-hearing section and can receive a backhaul downlink from a base station in the remaining region. In this case, since the relay node is unable to perform transmission and reception at the same time on the same frequency band, time taken to switch a mode of the relay node from a Tx mode to an Rx mode is required.

Hence, it is necessary to configure guard time (GT) in a first partial section of a backhaul downlink reception region to enable the relay node to perform Tx/Rx mode switching. Similarly, when the relay node is configured to receive a backhaul downlink from the base station and transmit an access downlink to the UE, it is able to configure guard time (GT) for Rx/Tx mode switching of the relay node. A length of the guard time can be provided by a value of a time domain. For example, the length of the guard time can be given by a value of the k (k≥1) number of time sample (Ts). Or, the length of the guard time can be configured by a length of one or more OFDM symbols. Or, guard time of the last part of a subframe may not be defined or configured when relay node backhaul downlink subframes are consecutively configured or according to a prescribed subframe timing alignment relationship.

In order to maintain backward compatibility, the guard time can be defined in a frequency domain, which is configured to transmit a backhaul downlink subframe, only (when guard time is configured in an access downlink section, it is unable to support a legacy UE). The relay node can receive PDCCH and PDSCH from the base station in a backhaul downlink reception section except the guard time. In particular, in a sense of a relay node-dedicated physical control channel, it may use such an expression as R-PDCCH (Relay-PDCCH).

Meanwhile, the present invention proposes a method for a mobile relay node to efficiently provide a mobile communication service to a terminal of a passenger on a fast moving plane, a train, a vehicle, or the like in a next generation wireless communication system. The mobile relay node is installed in a moving object and plays a role in relaying communication between a base station installed in the external and UEs positioned at the internal of the moving object. In downlink, the relay node receives data from the base station and forwards the data to UEs belonging to the coverage of the relay node. In uplink, the relay node performs an operation of forwarding data transmitted by a UE to the base station. The relay node may appear as a different base station forming a separate cell to the UE. When the UE is connected with the mobile relay node, since the UE is able to perform communication with the relay node positioned at a near location instead of the base station far from the UE and the base station blocked by wall of the moving object, communication efficiency increases. In addition, since multiple UEs are able to perform handover for moving a base station at a time by the appropriate control of the relay node, it is able to reduce delay due to the handover or signal overhead.

As mentioned in the foregoing description, when a relay node communicates with a base station via a link, the link is referred to as a backhaul link. When the relay node communicates with a UE via a link, the link is referred to as an access link. When Tx/Rx operations of the relay node are determined by a constant time unit (i.e., TTI (transmission time interval)), it is preferable to match synchronization of a frame of a backhaul link with synchronization of a frame of an access link as much as possible. In particular, when a relay node corresponds to a half-duplex relay node incapable of performing transmission in one link and performing reception in another link on a frequency band on which a backhaul link and an access link are managed, it is preferable to match synchronization of a frame of the backhaul link with synchronization of a frame of the access link as much as possible. This is because, when a Tx operation of one link is performed in one unit time, it is able to reduce time units incapable of performing an Rx operation in another link to one time unit.

Figure 11:
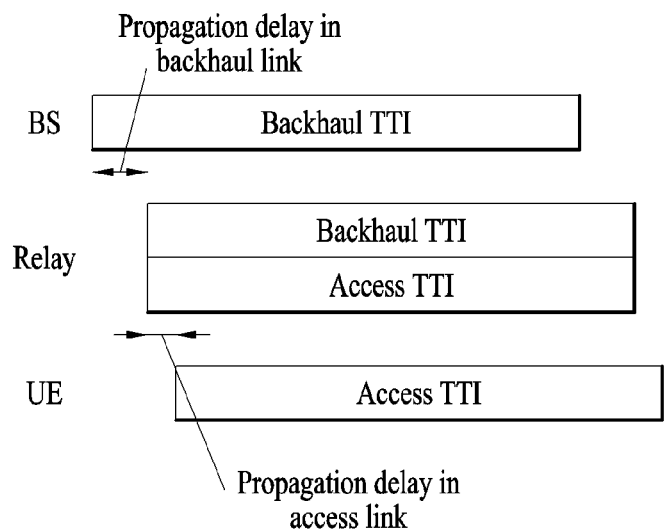
FIG. 11 illustrates frame synchronization that reception timing of a backhaul downlink is matched with transmission timing of a relay access link.

FIG. 11 illustrates frame synchronization that reception timing of a backhaul downlink is matched with transmission timing of a relay access link. In this case, it is apparent that it is able to configure frame synchronization in a manner of applying a predetermined offset between the reception timing of the backhaul downlink and the transmission timing of the access downlink.

However, it is not easy to fix frame synchronization of a backhaul link in fast moving environment. This is because, when a base station with which a relay node is connected changes, frame synchronization of a new base station is considerably changed in the aspect of the relay node due to a frame synchronization error between the base stations and a difference of propagation delay compared to frame synchronization of the old base station. Although movement is made within a single base station, if a moving object moves fast, propagation delay from the base station may considerably change within a short period of time. For example, when a moving object moves towards a base station with a speed of 500 km/h, the moving object moves about 138 m/s. This means that the timing of a signal of the base station arriving at a relay node becomes faster as much as 0.46 us per second. When a change of frame synchronization of a backhaul link is immediately reflected to an access link, a problem may occur. This is because, since a UE is unable to recognize relative mobility of the access link, the sudden change of the synchronization may lead to the failure of maintaining synchronization between the UE and the relay node and cause a temporary malfunction.

In the following, a frame synchronization scheme capable of solving a mobility problem of a backhaul link is explained.

First of all, in order to configure frame synchronization of a mobile relay node, a predetermined GP (guard period) is set to an access link TTI or a backhaul link TTI. The GP can be utilized for the purpose of absorbing the aforementioned synchronization error while a transmission/reception operation is not performed during the GP.

Figure 12:
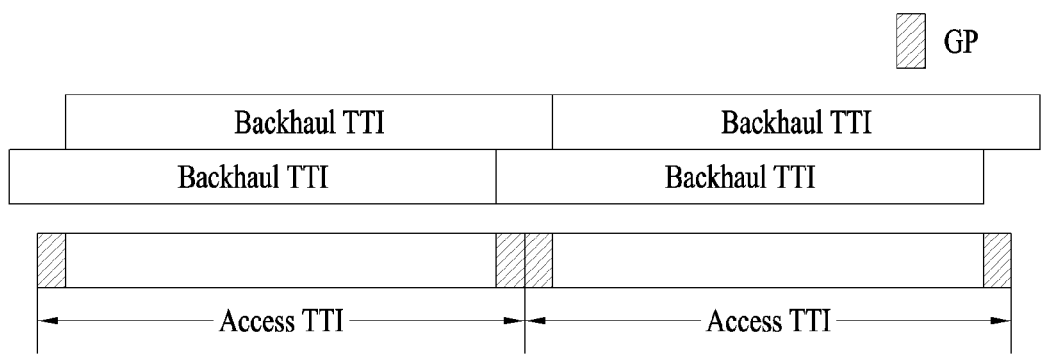
FIG. 12 illustrates an example of placing a GP within an access link TTI according to an embodiment of the present invention.

FIG. 12 illustrates an example of placing a GP within an access link TTI according to an embodiment of the present invention. Among backhaul TTIs illustrated in FIG. 12, the upper backhaul TTI corresponds to a case that a start point of a downlink backhaul TTI is able to arrive at a relay lastly. The lower backhaul TTI corresponds to a case that a start point of a downlink backhaul TTI is able to arrive at a relay firstly. When a movement is made within a single cell, the upper backhaul TTI corresponds to a case that propagation delay between a base station and a relay is a maximum and the lower backhaul TTI corresponds to a case that propagation delay between the base station and the relay is a minimum.

Referring to FIG. 12, when a TTI of a backhaul link exists between two adjacent GPs (in other word, when a difference value between the lastly arrived backhaul TTI and the firstly arrived backhaul TTI does not exceed the two GPs), a backhaul link and an access link can be TDMed in a unit of a TTI and it is able to use all time resources of the backhaul TTI. This scheme has a merit in that it is able to maximize available resources in a backhaul link of which a channel state is relatively poor. In general, in order for a relay node to switch an operation between a transmission operation and a reception operation, prescribed time is required. Hence, the GP described in FIG. 12 can also be utilized for the purpose above.

Meanwhile, a GP can be positioned at a TTI of a backhaul link or a TTI of an access link in various forms.

Figure 13:
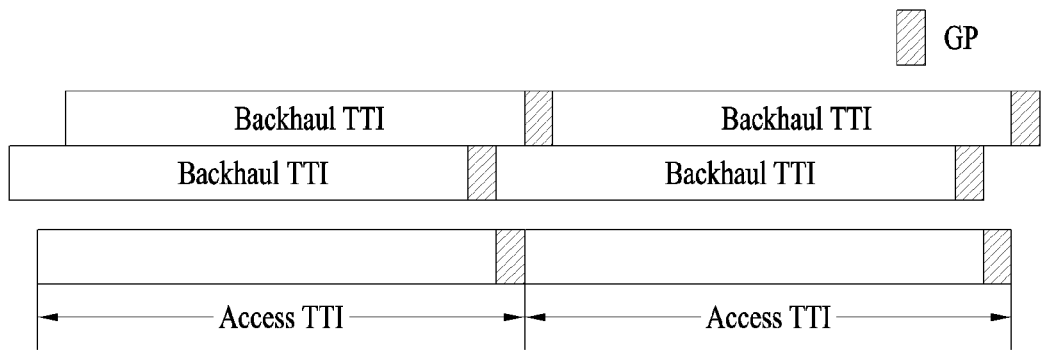
FIG. 13 illustrates an example of placing a GP at the ends of a backhaul TTI and an access TTI according to an embodiment of the present invention.

FIG. 13 illustrates an example of placing a GP at the ends of a backhaul TTI and an access TTI according to an embodiment of the present invention. Referring to a structure illustrated in FIG. 13, the structure has a merit in that it is able to maintain a common structure that a backhaul link and an access link use a resource from the first timing (e.g., first symbol) and a GP is positioned at the last.

Although it is not illustrated in FIGS. 12 and 13, all GPs can be positioned at a backhaul link.

While a base station sets a GP to a backhaul link and/or an access link in consideration of a size of a cell, synchronization error between cells, and the like, the base station guarantees that the maximum error of the arrival timing of a backhaul TTI does not exceed a GP. By doing so, it is able to prevent a collision from being occurred between the backhaul link and the access link at the outside of the GP (i.e., a case that a backhaul section of a previous TTI and an access section of a next TTI are partly overlapped).

Meanwhile, when a backhaul TTI is instantaneously and considerably dislocated at the specific timing, a GP may fail to accept an error between the backhaul TTI and the access TTI.

Figure 14:
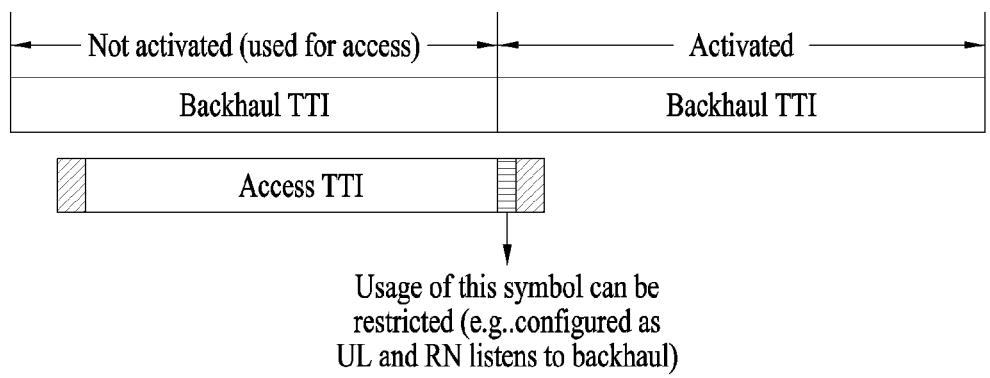
FIG. 14 illustrates an example that a GP fails to accept an error between a backhaul TTI and an access TTI.

FIG. 14 illustrates an example that a GP fails to accept an error between a backhaul TTI and an access TTI. In particular, FIG. 14 illustrates a case that the configuration of the GP mentioned earlier in FIG. 12 is used and a start point of a backhaul TTI appears prior to a GP start point of a previous access TTI by more putting forward the start point of the backhaul TTI.

In this case, a collision may occur between a backhaul link operation and an access link operation in a partial time region. The collision may suddenly occur in a state that it is difficult to anticipate the collision in advance. For example, the collision may occur due to a handover which is performed at the timing incapable of being anticipated by a relay node. In order to solve the problem, the relay node may perform an appropriate operation. In particular, the relay node may assign a priority to a backhaul link operation (i.e., receives a downlink backhaul by terminating transmission of downlink access or transmits an uplink backhaul by terminating reception of uplink access) to make a base station, which operates while failing to recognize the situation above, to have backhaul and access together without any separate action.

For example, the relay node may extend a length of a GP by dynamically changing a configuration of an access TTI. Or, the relay node configures a problematic time region as a specific region (e.g., a region in which an uplink control signal utilizing transmission of short time is transmitted or a region in which an uplink SRS (sounding reference signal) is transmitted). In this case, the relay node schedules transmission of a UE not to be performed in the region to utilize the region as the usage of backhaul. In particular, when it is determined that the start point of a backhaul link is going to enter the inside of a GP within a relatively short time period or a TTI boundary of an access link is reconfigured, the region can be used as a temporary solution.

Meanwhile, when the timing of a backhaul TTI is considerably changed like a case that a synchronization error is big, more specifically, a case that handover is made between two base stations having a synchronization error equal to or greater than a predetermined threshold, it is necessary to adjust the timing of an access TTI as well. In this case, it is necessary for a relay node to stop an operation of the access link for a while. This means that transmission of a reference signal (RS), which is periodically transmitted to UEs to maintain minimum synchronization, is terminated as well. Hence, the relay node can transmit a message to the UEs to inform the UEs of the temporary transmission termination.

Or, the relay node can inform the UEs that the timing of the access TTI is to be reconfigured within prescribed time. Having received the message, the UEs discard a legacy TTI boundary, search for a new TTI boundary, and can immediately access the relay node. Specifically, when the operation of the access link is terminated, in the aspect of the UEs, it appears that a periodical synchronization signal is suddenly disappeared. It may take a long time for the UEs to distinguish the suddenly disappeared synchronization signal from an instantaneous channel state deterioration and unnecessary delay may occur on a communication service. On the contrary, if the relay node informs the UEs that the timing of the access TTI is to be reconfigured within prescribed time, it is able to solve the problem above. When a new base station assigns a new cell ID to the relay node, the relay node informs the UEs of the new cell ID to be used by the new base station via the message to make the UEs to be more promptly connected with the relay node using a new TTI boundary.

The operation above can be distinguished from a case that a UE initially accesses a new cell. For example, since a distance between the UE and the relay node seldom changes, it may omit a random access procedure by reusing a previously used TA (timing advance). And, it may maintain an accumulated power control command value in a previously used power control. Besides, it may configure an ID of a UE or various parameters to be maintained to reduce time taken for assigning corresponding configurations to all UEs.

In particular, a configuration parameter can include parameters related to an initial access. For example, the configuration parameter can include a parameter for a position of a resource transmitting a random access preamble, a parameter for an attribute of an RS which is periodically transmitted for time/frequency synchronization, and the like. Moreover, the configuration parameter can include a configuration for performing communication of an individual UE. For example, the configuration parameter can include a transmission mode of PDSCH, a CSI report mode, and the like.

Figure 15:
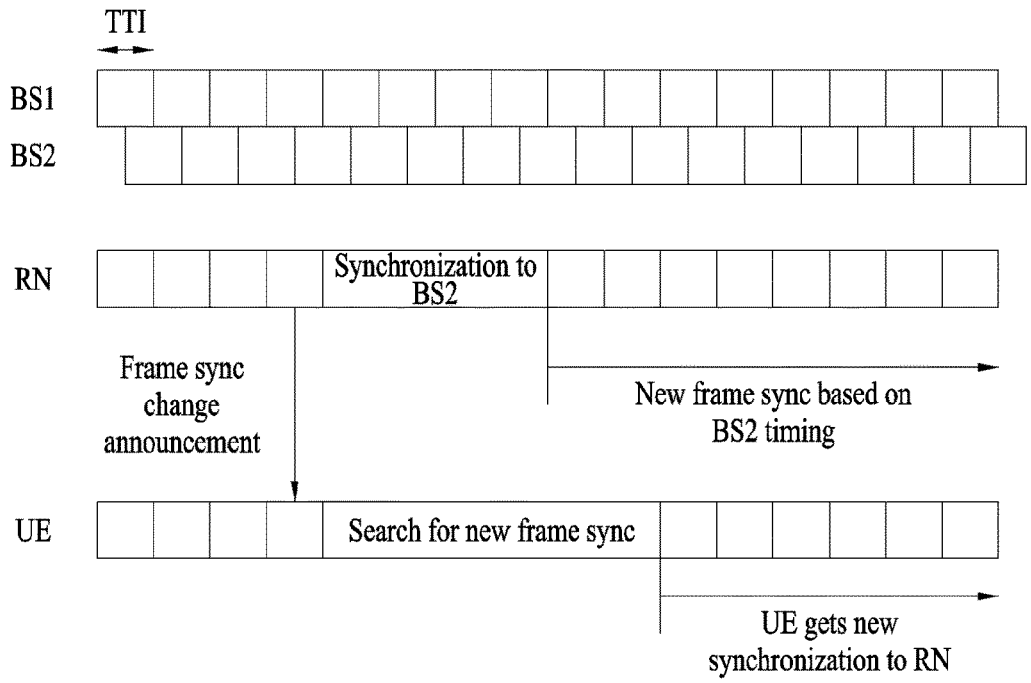
FIG. 15 illustrates an example that a mobile relay node reconfigures frame synchronization according to an embodiment of the present invention.

FIG. 15 illustrates an example that a mobile relay node reconfigures frame synchronization according to an embodiment of the present invention. In FIG. 15, assume a situation that a handover is made to a base station 2 when a relay node performs a backhaul link operation in a manner of being connected with a base station 1.

Referring to FIG. 15, having identified the occurrence of the handover, the relay node transmits a message to a UE connected with the relay node to inform the UE of a change of frame synchronization and performs synchronization and a connection operation to the base station 2. Having received the message, the UE anticipates that the relay node is going to transmit a synchronization signal based on new synchronization and attempts to detect the new synchronization. Subsequently, the relay node completes the synchronization to the base station 2 and transmits a synchronization signal to the UE in accordance with the new synchronization. The UE detects the synchronization signal and initiates an access link operation with the relay node based on the new synchronization of the relay node.

When the relay node performs handover with a new base station, since it is difficult for the relay node to guarantee an access link operation, it is able to regulate that the relay node temporarily terminates an access link and performs a backhaul link operation at all timings. The regulation can be maintained until the new base station forwards a message for permitting an access link operation (e.g., a message for designating a resource that transmits a periodical synchronization signal via an access link). Or, in order to prevent excessive termination of an access link, when handover is performed with a new base station, a position of a time resource to be used as the access link is designated to a handover message transmitted by a previous base station to perform a minimum access link operation while the handover is performed.

As mentioned in the foregoing description, when an access link operation is terminated in the middle of performing handover, if transmission of a synchronization signal or an RS for performing long-term measurement is terminated as well, time taken for a UE intending to be newly connected with the relay node can be excessively delayed at the corresponding timing. In particular, when synchronization changes in a backhaul link due to handover, and the like, it is preferable to guarantee transmission of a basic signal such as a synchronization signal in an access link or an RS for performing long-term measurement. Although synchronization is not perfectly matched between base stations, if the synchronization is matched within a predetermined error and the error is relatively and sufficiently small enough compared to a period of transmitting the signal, the operation above can be performed. In particular, the timing at which the synchronization signal of the relay node or the RS for performing long-term measurement is periodically transmitted is restricted to a specific time region and the base stations match synchronization as much as possible at the remaining timings to make the base stations transmit a signal to be received by the relay node in the middle of performing handover. Although the maximum synchronization error occurs, when the relay node is able to transmit a signal at timing, it is able to control transmission of a base station not to be performed at the timing.

For example, it is able to configure a main signal transmission section of the relay node by excluding a section belonging to the maximum range of a synchronization error between base stations from the specific reference timing. For example, assume that a main signal transmission of the relay node is repeated with an interval of P on the basis of the specific reference timing t0 and the maximum synchronization error of a base station compared to absolute time corresponds to E. In this case, the timing of transmitting a signal transmitted by the relay node can be configured by a region rather than a region corresponding to [t0+n*P−2*E−M1, t0+n*P+2*E+M2+T].

In this case, M1 and M2 correspond to time margins due to elements other than a synchronization error between base stations. For example, M1 and M2 correspond to margins for distributing a synchronization signal transmitted by a different base station or an RS for performing long-term measurement in time. A base station transmits the synchronization signal or the RS between the timing appearing before the reference timing as much as M1 TTI and the timing appearing after the reference timing as much as M2 TTI. The relay node may fail to transmit a synchronization signal of the relay node at the timing at which the synchronization signal or the RS is transmittable. And, T denotes a length of time taken for a base station to transmit the synchronization signal or the RS.

Figure 16:
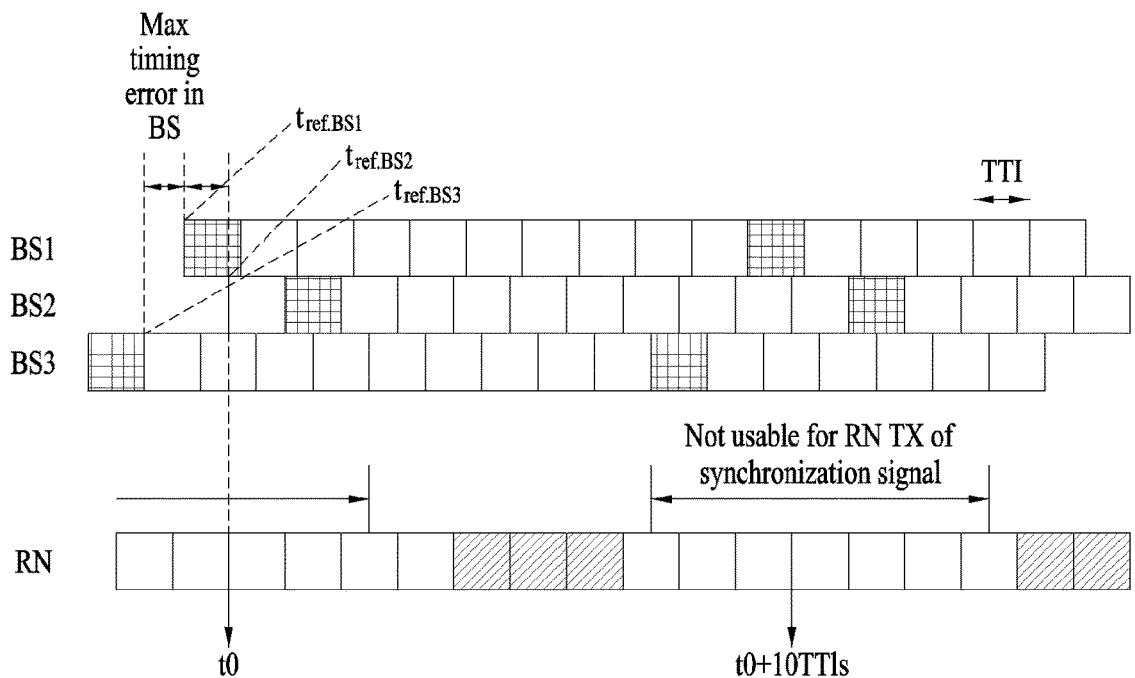
FIGS. 16 and 17 illustrate examples of configuring a main signal transmission section of a relay node according to an embodiment of the present invention.
Figure 17:
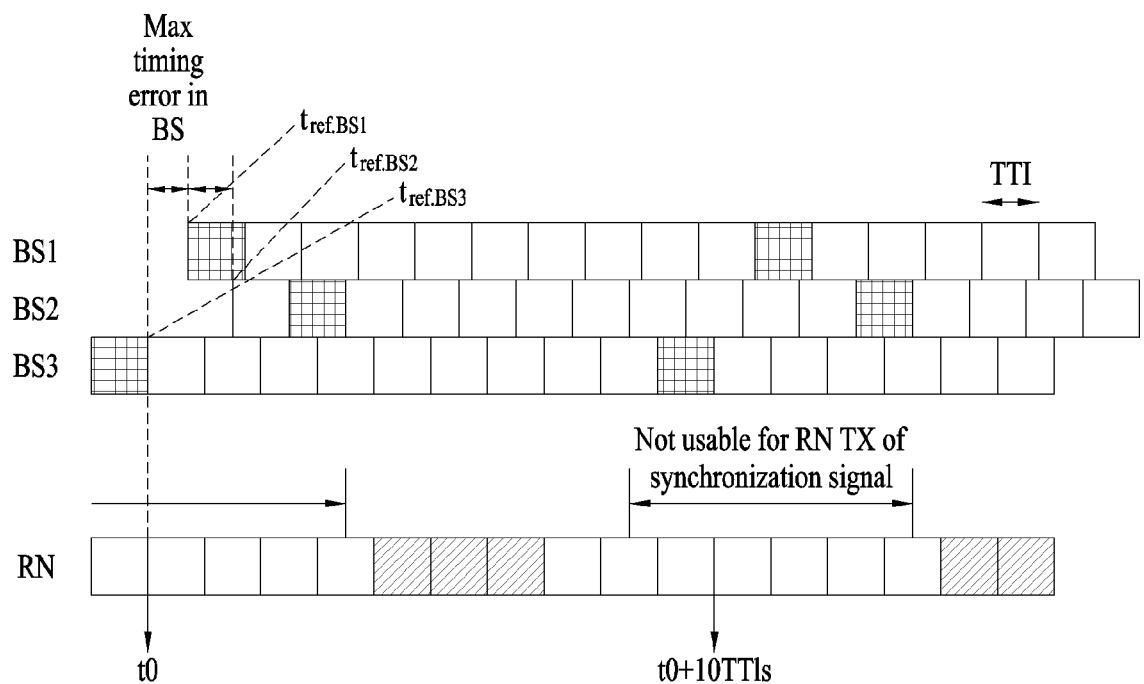

FIGS. 16 and 17 illustrate examples of configuring a main signal transmission section of a relay node according to an embodiment of the present invention. In particular, in FIGS. 16 and 17, when M1, M2, and T correspond to 1 TTI, respectively, and E corresponds to 0.75 TTI, assume that a synchronization signal is transmitted one time during 10 TTIs. In this case, although each of base stations considers the timing corresponding to $t_{ref}$ as the reference timing, assume that a base station 1 configures the reference timing without an error of absolute time and base stations 2 and 3 respectively configure the reference timing using the timings separated as much as +E and −E corresponding to the maximum error. Since the M1 and the M2 correspond to 1 TTI, base stations transmit a reference signal by determining that main signal transmission of the relay node is not performed in a TTI starting from the reference timing of the base stations, a previous TTI, or a next TTI.

And, assume that the base station 1 transmits a synchronization signal in a TTI starting at the reference timing, the base station 2 transmits a synchronization signal in a TTI starting at the timing appearing after 1 TTI from the reference timing, and the base station 3 transmits a synchronization signal in a TTI starting at the timing appearing before 1 TTI from the reference timing.

Referring to FIG. 16, a relay node is firstly connected with the base station 2, matches the reference timing t0 of the relay node with $t_{ref,BS2}$, and identifies a TTI capable of transmitting a main signal of the base station 2. In FIG. 16, it is able to see that 3 hatched TTIs among 10 TTIs correspond to TTIs capable of transmitting a main signal of the relay node. On the contrary, referring to FIG. 17, a relay node is firstly connected with the base station 3 and matches the reference timing t0 of the relay node with $t_{ref,BS3}$.

In both cases of FIGS. 16 and 17, if the relay node transmits a synchronization signal in a hatched TTI, it is not necessary to terminate transmission of a synchronization signal of the relay node to receive a synchronization signal of a base station irrespective of a base station to which the relay node moves. To this end, a base station can inform the relay node of a value corresponding to the maximum time error of the base station or a margin capable of transmitting a main signal of the base station. Or, the base station can designate a TTI or a set of TTI candidates capable of transmitting a synchronization signal or an RS for performing long-term measurement to the relay node.

Although the aforementioned operations assume that a TTI length of a base station is identical to a TTI length of the relay node, the principle of the operation can also be applied to a case that the TTI length of the base station is different from the TTI length of the relay node. In particular, when the TTI length of the relay node is shorter than the TTI length of the base station, if a synchronization error of a backhaul link occurs, the relay node controls the backhaul link operation timing using a TTI unit of the relay node to handle the synchronization error of the backhaul link. Of course, the relay node can inform UEs connected with the relay node of a TTI operating as a backhaul using a TTI not operating as access.

Figure 18:
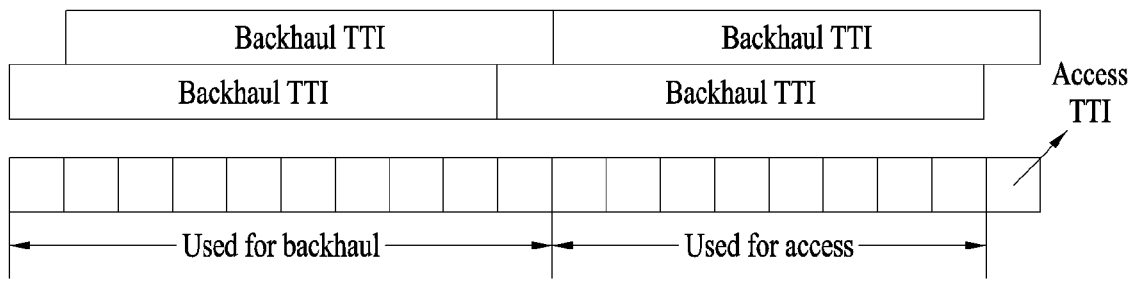
FIG. 18 illustrates a situation that an access TTI is shorter than a backhaul TTI.

FIG. 18 illustrates a situation that an access TTI is shorter than a backhaul TTI. In particular, FIG. 18 illustrates a case that an access TTI length is shortened in the situation mentioned earlier in FIGS. 12 and 13.

Referring to FIG. 18, when the front side backhaul TTI is used as an actual backhaul link in a situation that operation timing of a backhaul link is not fixed, it is preferable for a relay node to perform a backhaul operation in all TTIs capable of being overlapped with a backhaul TTI and terminate an access link operation. When a backhaul link operation is terminated and an access link operation is performed at the next timing, the relay node can be configured to perform an access operation using an access TTI at the timing belonging to the same backhaul TTI only in any error situation.

Figure 19:
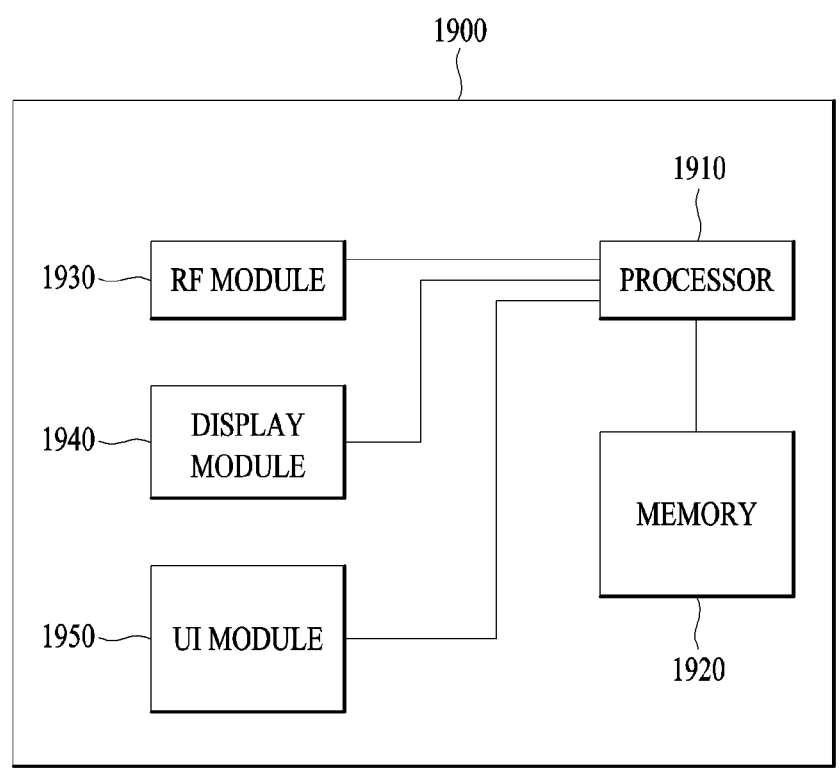
FIG. 19 is a block diagram illustrating a communication device according to embodiments of the present invention.

FIG. 19 is a block diagram of a communication apparatus according to an embodiment of the present invention.

Referring to FIG. 19, a communication device 1900 includes a processor 1910, a memory 1920, a radio frequency (RF) module 1930, a display module 1940, and a user interface (UI) module 1950.

The communication device 1900 is illustrated for convenience of description and some modules may be omitted. The communication device 1900 may further include necessary modules. Some modules of the communication device 1900 may be further divided into sub-modules. The processor 1900 is configured to perform operations according to the embodiments of the present invention exemplarily described with reference to the drawings. Specifically, for a detailed description of operations of the processor 1900, reference may be made to the description described with reference to FIGS. 1 to 18.

The memory 1920 is connected to the processor 1910 and stores operating systems, applications, program code, data, and the like. The RF module 1930 is connected to the processor 1910 and performs a function of converting a baseband signal into a radio signal or converting a radio signal into a baseband signal. For this, the RF module 1930 performs analog conversion, amplification, filtering, and frequency upconversion or performs inverse processes thereof. The display module 1940 is connected to the processor 1910 and displays various types of information.

The display module 1940 may include, but is not limited to, a well-known element such as a liquid crystal display (LCD), a light emitting diode (LED), or an organic light emitting diode (OLED). The UI module 1950 is connected to the processor 1910 and may include a combination of well-known UIs such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

It is apparent to those skilled in the art that the present invention may be carried out in other specific ways than those set forth herein without departing from the characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

Although a method of configuring synchronization for a mobile relay node in a next generation wireless communication system and an apparatus therefor are described with reference to examples applied to 3GPP LTE system, it may be applicable to various kinds of wireless communication systems as well as the 3GPP LTE system.

What is claimed is:

1. A method of transmitting and receiving a signal by a relay node in a wireless communication system, the method comprising:
    during communication based on a first backhaul link synchronization and a first access link synchronization, transmitting change initiation information indicating a change to a second backhaul link synchronization to a user equipment (UE);
    setting frame synchronization with the second backhaul link synchronization from the first backhaul link synchronization;
    transmitting a synchronization signal to the UE to set a second access link synchronization with the UE, wherein the second access link synchronization is determined based on the second backhaul link synchronization; and
    after the second access link synchronization is set, transmitting and receiving the signal with the UE according to the second access link synchronization using a parameter corresponding to the first access link synchronization,
    wherein the parameter contains at least one of a TA (Timing Advance) value for access uplink of the UE and a power control factor.

2. The method of claim 1, wherein the change initiation information is transmitted to the UE when a difference between the first backhaul link synchronization and the second backhaul link synchronization is equal to or greater than a threshold.

3. The method of claim 1, wherein setting the frame synchronization with the second backhaul link synchronization comprises performing handover from a first base station corresponding to the first backhaul link to a second base station corresponding to the second backhaul link.

4. The method of claim 1, wherein transmitting the synchronization signal to the UE comprises transmitting information on a resource for transmitting the synchronization signal to the UE.

* * * * *